US010864712B2

(12) United States Patent
Valdmaa et al.

(10) Patent No.: US 10,864,712 B2
(45) Date of Patent: Dec. 15, 2020

(54) METHOD FOR LAMINATING PLASTIC PROFILES PRODUCED FROM MIXED POLYMERS

(71) Applicant: Oü Elegro Invest, Tallinn (EE)

(72) Inventors: Andrus Valdmaa, Tartu County (EE); Aivo Käsnar, Tartu (EE); Aarne Saareväli, Tallinn (EE)

(73) Assignee: Oü Elegro Invest, Tallinn (EE)

( * ) Notice: Subject to any disclaimer, the term of this patent is extended or adjusted under 35 U.S.C. 154(b) by 0 days.

(21) Appl. No.: 15/979,518

(22) Filed: May 15, 2018

(65) Prior Publication Data
US 2018/0333944 A1 Nov. 22, 2018

(30) Foreign Application Priority Data

May 16, 2017 (EP) ..................... 17171429

(51) Int. Cl.
*B32B 38/00* (2006.01)
*B32B 37/12* (2006.01)
*B32B 7/12* (2006.01)
*B32B 27/08* (2006.01)
*B32B 27/16* (2006.01)
*B32B 27/30* (2006.01)
*B32B 41/00* (2006.01)

(52) U.S. Cl.
CPC .......... *B32B 38/0036* (2013.01); *B32B 7/12* (2013.01); *B32B 27/08* (2013.01); *B32B 27/16* (2013.01); *B32B 27/308* (2013.01); *B32B 37/12* (2013.01); *B32B 37/1207* (2013.01); *B32B 38/0008* (2013.01); *B32B 41/00* (2013.01); *B32B 2037/1215* (2013.01); *B32B 2250/02* (2013.01); *B32B 2272/00* (2013.01); *B32B 2305/70* (2013.01); *B32B 2307/542* (2013.01); *B32B 2309/02* (2013.01); *B32B 2310/0463* (2013.01); *B32B 2310/14* (2013.01)

(58) Field of Classification Search
CPC .......... B32B 7/12; B32B 27/08; B32B 27/16; B32B 27/308; B32B 37/12; B32B 38/008; B32B 38/0036; B32B 41/00; B32B 37/1207
See application file for complete search history.

(56) References Cited

U.S. PATENT DOCUMENTS

| 6,153,306 | A | * | 11/2000 | Selin | ...................... B32B 27/10 |
| | | | | | 428/481 |
| 2015/0306804 | A1 | * | 10/2015 | Valdmaa | ................. B29C 48/06 |
| | | | | | 428/318.6 |
| 2016/0361901 | A1 | | 12/2016 | Dodge, III | |
| 2018/0002932 | A1 | * | 1/2018 | Van Giel | ................. B32B 27/20 |

FOREIGN PATENT DOCUMENTS

DE    4133634 A1    4/1993

OTHER PUBLICATIONS

Düpohl Maschinenbau GmbH, Profile wrapping, Jun. 3, 2017, https://web.archive.org/web/20170603190906/http://www.duespohl.de/en/profile-wrapping/, retrieved on Oct. 15, 2018.
DTS-Systemoberflächen GmbH, https://www.laminate.de/index.php/en/company/elesgo-en, retrieved on oct. 15, 2018.
DTS-Systemoberflächen GmbH, https://www.laminate.de/index.php/en/technology-alias/process-en, retrieved on Oct. 15, 2018.

* cited by examiner

*Primary Examiner* — George R Koch
(74) *Attorney, Agent, or Firm* — Berggren LLP

(57) ABSTRACT

A method for laminating profile and plate materials produced from processed mixed plastic waste and other plastic surfaces comprises steps of collecting and processing of mixed plastic waste for recycling for making profile and plate materials and lamination of profile and plate materials produced from processed mixed plastic waste, wherein the lamination of profile and plate materials produced from processed mixed plastic waste comprises stabilizing the profile temperature before lamination; determining the surface quality; making the surface quality of profile suitable by propane gas treatment of the profile; heating the profile surface before the lamination process; heating the adhesive right before the lamination; applying the adhesive to the laminate surface; carrying out the lamination process; and directing the laminated profiles for storying.

8 Claims, No Drawings

METHOD FOR LAMINATING PLASTIC PROFILES PRODUCED FROM MIXED POLYMERS

PRIORITY

This application claims priority of European application number EP17171429 filed on 16 May, 2017 the content of which is incorporated herein by reference.

FIELD OF THE INVENTION

This present invention belongs to the field of laminating plastic profiles, more specifically to the field of laminating plastic profiles that are produced from mixed polymers.

PRIOR ART

It is well known that plastic is the most widely used material in the world because of its durability and flexibility, but at the same time, the plastic pollution is also widely recognized. The best possibility to reduce the amount of the world's plastic waste is recycling. When compared to other materials like glass and metal, plastic polymers require greater processing to be recycled. Plastic packing (e.g. plastic bags, plastic packing of food products and consumer goods) and other plastic waste (box pallets, garden furniture, buckets, plastic sledges, car bumpers, canisters, pipes, bobbins, computer cases, TV sets, plastic refrigerator details, etc.) form the most problematic and continuously growing type of waste, that according to common solutions can be mainly landfilled, incinerated or used as filling material. The initial sorting of waste and subsequent recycling of single-type plastics into uniform mass, granules or new products are the generally known solutions for recycling plastic. As the use of plastic products is very widespread, reuse of the plastic waste represents a huge challenge. Recycling is normally performed based on one specific type of plastic, e.g. LDPE, HDPE, PS, PP or PET, in the course of which the sorted plastic waste is washed, broken up, dried and granulated. One of the known reuse possibilities of recycled plastic products is laminating the plastic profiles (for example window and door frames, fences, furniture, decking boards, tongue and groove boards, planks, posts, beams, etc.) to give them desired properties (for example, maintenance-free, easy to clean, stain-free, rot-free, does not absorb moisture, mould-free, non-slip, UV resistance, solid core, non-toxic, dirt-repellence, splinter-free, superb noise insulation).

When comparing polymer materials to other materials like glass and metals, the polymers of plastic need longer processes to enable their recovery. The biggest problem is posed by the fact that polymers of different types are immiscible with each other because of their different molecular weights and long polymer chains. Heating the polymers with traditional methods is not sufficient for decomposing polymer molecules; therefore, the polymers to be recovered must often have identical compositions to achieve effective mixing. When plastics wastes of different types of mixed polymers (for example HDPE, LDPE, PP, PS, ABS, etc.) are processed, recycled without sorting different polymers from the plastic waste mass beforehand and directed for using as new plastic products, then these products produced from mixed polymers are extremely difficult to laminate.

The drawback of solutions known to date is that profiles produced from mixed plastics, including plastic profiles with polyolefin composition (the adherence of which is lower than with PVC profiles), are very difficult to laminate qualitatively because it is difficult to obtain such adherence between coating to be laminated and plastic profile which results in avoiding delamination in external conditions in the temperature range from −40° C. to +80° C. Thus, with solutions know to date, as a result of temperature, air humidity, contact with water and UV radiation, the drawback is insufficient adherence of the laminate and different thermal expansion of the profile and the laminate.

Solutions are well known in which plastic surfaces and plastic products produced from single-type polymer are laminated. It is more difficult to laminate plastic products which are produced from the mixture of polymers of different types.

The closest solution to the method according to the present invention may be, for example, lamination of window profiles made of PVC material. The drawback of this solution is that when replacing the PVC material with polyolefin-group plastic material produced from mixed plastics, then lamination by using the same method does not guarantee adherence of the laminate to such profile and the laminate does not adhere to the profile.

BRIEF DESCRIPTION OF THE INVENTION

The aim of the present invention is to provide a method for laminating plastic profiles produced from mixed polymers (mainly polyolefins) that guarantees long-lasting grip between such profile and laminate, which are meant to be used in external conditions in summer as well as in winter upon expansion and shrinkage in great temperature ranges, which do not absorb moisture and are water-resistant and do not let moisture to penetrate under the laminate between the laminated surface and the laminate.

The aim is achieved by a method where surface energy of the profile is changed with the propane gas flame while using appropriate mixture of gas, also distance of the gas from the profile, timing for changing the profile surface energy, temperature of the profile before lamination, adhesive temperature settings and profile movement speed.

The properties achieved by using the method according to the present invention are peeling strength; no delamination of laminate from the profile after stress tests: cold-hot test, temperature range from −40° C. to +80° C.; 10 hours in boiling water; increased humidity test; keeping laminated profile under water during a period of 6 months.

DETAILED DESCRIPTION OF THE INVENTION

The method for laminating profile and plate materials produced from processed mixed plastic waste as well as other plastic surfaces comprises the following steps:

mixed plastic waste is collected and processed for recycling as profile and plate materials;

stabilizing the profile temperature before lamination and plastic surface of profile or plate materials to be laminated are prepared;

before starting the lamination process, the surface quality of the laminated surface is determined;

making the surface quality of profile suitable by propane gas treatment of the profile;

the laminated surface is heated before the lamination process;

right before the lamination, the adhesive is heat-treated;

applying the adhesive to the laminate surface;

carrying out the adhesion (lamination) process;
directing the laminated profiles for storying.

In order to use the method of the present invention for laminating the products produced from processed mixed plastic waste, the corresponding mixed plastic waste are first collected and processed for recycling as profile and plate materials.

Then the plastic surface of the profile or plate material to be laminated is prepared such that the temperature of the cross-section of the laminated surface is from +15° C. to +22° C. for ensuring adhesion and avoiding delamination, if the profile is cold or too hot, the process will not function.

Before the lamination process, the surface quality is determined where testers of determination of surface adherence level are used. According to the present invention, the adherence of the laminated surface is at least 40 mN/m before the lamination.

For changing the surface quality, plasma, corona or gas treatments are used, for example, wherein best results gives gas treatment. As a flame, for instance, a propane-based flame is used, which ensures sufficient heat treatment of the surface for guaranteeing adherence (which, for example, plasma treatment and chemical treatment do not allow), wherein the ratio of the mixture of air and propane is preferably 25:1 and the flow rate of the mixture is 220 l per minute. As such, the surface adherence of the laminated profile is more than 40 according to the scale of the testers. The propane flame is used 45-50 mm away from the profile surface, because a smaller distance damages the surface and a greater distance does not change the surface quality enough.

Before adhesion, the temperature of the laminated surface is brought to the range of 45-55° C. by changing the surface quality with propane flame.

The process of surface treatment in the step of changing the surface quality is carried out 5-10 seconds before the adhesion process.

Right before lamination, heat treatment and application of adhesive, polyurethane-based adhesive or some other hot-melt adhesive is carried out, wherein the resistance to cold or heat thereof is between at least −40° C. to 150° C. Heat treatment of the adhesive is carried out in the range 120-137° C., for instance, at 120-125° C. when using acrylate coating, at 120-137° C. when using polymethylmethacrylate laminate for laminating vertical surfaces. Then the adhesion (lamination) process is carried out, for example, with profiles of cross-section from 70 mm×15 mm to 150 mm×100 mm with a rate of 14-16 m/min, wherein polyurethane adhesive is used as an adhesive, for example, and electron beam cured decor surfaces are used for lamination which ensures resistance to scratches and bending of the laminate over the edge of the laminated surface.

Polyurethane adhesive is elastic between the laminate and the plastic profile to be laminated which allows stretching and the polyurethane adhesive itself is able to shrink and expand in the same range as the laminated surface.

Angular radiuses of the profiles are at least R5 depending on the bending properties of the laminate. For instance, laminate used on the terrace boards is rigid and, therefore, profiles with rounded angles are preferred. For instance, flexible laminate is used with window profiles and in such a case, steeper angle of the profiles is preferred.

The flow rate of the heat-treated adhesive is between 60-70 g/m².

The invention claimed is:

1. A method for making laminated profile and plate materials, the method comprising steps of:
   providing a profile or plate consisting of recycled mixed plastic waste;
   stabilizing a temperature of the profile or plate such that the temperature of a cross-section of the profile or plate is 15° C. to 22° C.;
   determining an adherence of a surface of the profile or plate to be laminated;
   changing the adherence of the surface of the profile or plate to be laminated to be at least 40 mN/m;
   heating the surface of the profile or plate to be laminated to 45 to 55° C. before a lamination process;
   heating the adhesive right before the lamination process;
   applying an adhesive to the surface of the profile or plate to be laminated maximally 5-10 seconds after the surface of the profile or plate to be laminated reached the temperature of 45 to 55° C.; and
   carrying out the lamination process.

2. The method according to claim 1, wherein plasma, corona or gas treatment is used to change the adherence of a surface of the profile or plate to be laminated.

3. The method according to claim 1, wherein propane-based flame is used to change the adherence of a surface of the profile or plate to be laminated.

4. The method of claim 3, wherein the propane-based flame is provided by burning a gas mixture having an air to propane ratio of 25:1.

5. The method according to claim 1, wherein the heating of the adhesive is carried out in the range of 120–137° C.

6. The method according to claim 1, wherein an acrylate laminate is used for lamination.

7. The method according to claim 1, wherein a polymethylmethacrylate laminate is used for lamination.

8. The method according to claim 1, wherein a polyurethane adhesive is used as the adhesive.

* * * * *